United States Patent Office 3,545,871
Patented Dec. 8, 1970

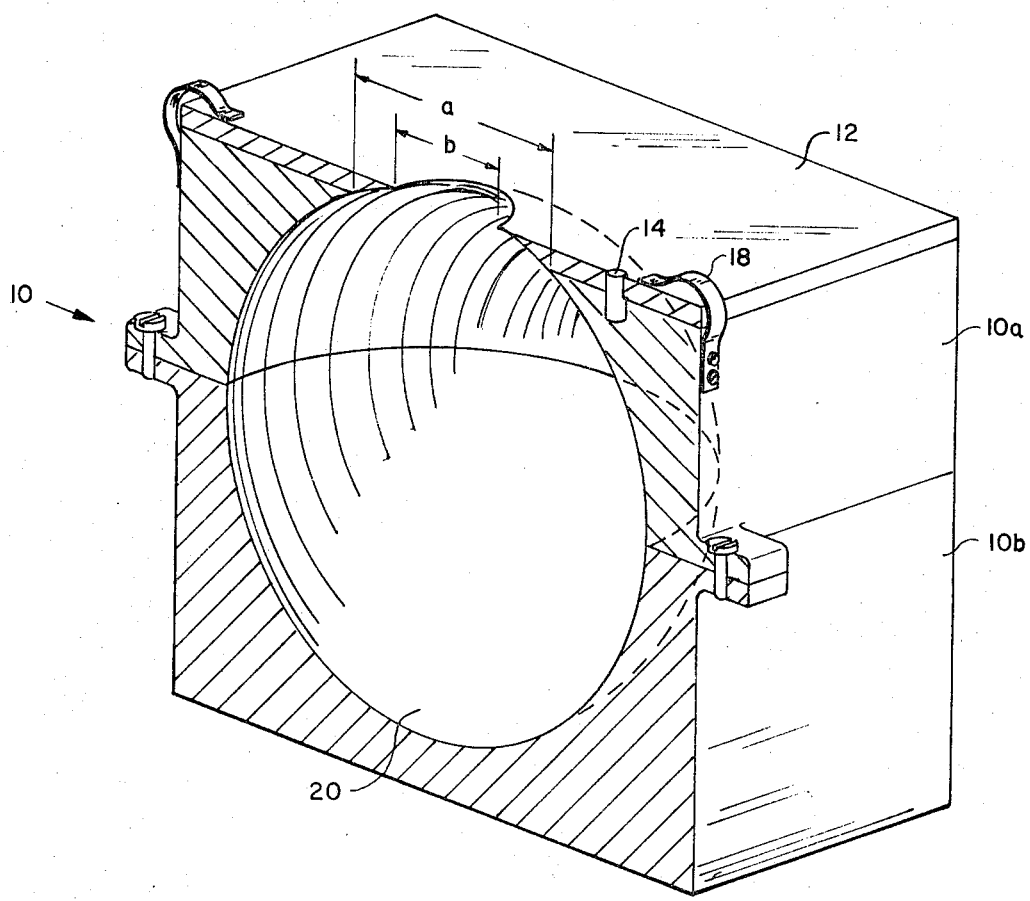

3,545,871
DIFFERENTIAL-PORT SPHERE FOR ABSOLUTE DIFFUSE SPECTRAL REFLECTANCE MEASUREMENTS AND METHOD
Franklyn L. Waska, Chino, Calif., assignor to Beckman Instruments, Inc., a corporation of California
Filed May 31, 1968, Ser. No. 733,480
Int. Cl. G01j 1/04
U.S. Cl. 356—236                                   4 Claims

ABSTRACT OF THE DISCLOSURE

A differential-port sphere for absolute diffuse spectral reflectance measurements is disclosed. The sphere has a diffuse cavity surface and two ports of different areas. By obtaining spectroreflectometer instrument readings of the sphere with both ports, the absolute wall reflectance of the differential-port sphere may be computed. This wall reflectance may then be used to calibrate the spectroreflectometer or other instrument standard.

---

This invention relates to the determination of absolute diffuse spectral reflectance and more particularly to a new and novel method and apparatus for making such determinations.

In order to determine with accuracy the absolute diffuse reflectance of a sample as a function of wavelength the state of the art now requires that the reflectance of such sample be compared with the reflectance of a standard whose absolute diffuse spectral reflectance is known. The accuracy of such measurement is thus dependent upon the accuracy to which the absolute diffuse spectral reflectance of the standard is known. This invention is directed to a new and novel method and apparatus for determining the absolute diffuse spectral reflectance of such a standard.

Diffuse reflectance measurements are commonly made by comparing the reflectance of an unknown sample with that of a known standard utilizing a spectroreflectometer such as that illustrated in U.S. Pat. No. 2,992,588. Such a measurement requires the accurate determination of the reflectance of the standard and the calibration of the spectroreflectometer based on the reflectance of such standard. One of the currently accepted methods of calibrating a reflectance standard is through the use of the auxiliary sphere and flat plate method which utilizes the integrating sphere of a spectroreflectometer operating in the double beam mode to measure the ratio of two reflectances. If separate reflectance measurements are made on two different samples on the same instrument, the same instrumental constants are contained in each measurement and the accuracy of the reflectance determination of the sample is thus dependent upon the accuracy to which the reflectance of the standard is known.

The auxiliary sphere and flat plate method is set forth in Standard Method for Absolute Calibration of Reflectance Standards, ASTM Designation E306–66 adopted by the American Society for Testing and Materials, 1966. This method utilizes an auxiliary sphere and a flat plate whose surfaces are coated with the same material in the same manner such that it is assumed that the reflectance of the sphere and the flat plate are identical. An instrument reading, $Q_s$, for the auxiliary sphere is obtained at the desired wavelength, or as a function of wavelength, by placing the sphere at the sample port of the integrating sphere illustrated in the aforementioned patent. An instrument reading, $Q_f$, for the flat plate is obtained at the same wavelength, or as a function of wavelength, by substituting the plate at the sample port of the integrating sphere for the auxiliary sphere. During these measurements the other port is covered with a plate having the same coating as the integrating sphere. The flat plate may be utilized as the instrument standard or, if desired, the instrument reading $Q_r$, for a durable instrument standard is then obtained in like manner.

The ratio of the instrument reading $(Q_f)$ for the flat plate to the instrument reading $(Q_s)$ for the auxiliary sphere is then computed at each wavelength of interest and the absolute reflectance $(\rho_f)$ at each wavelength is calculated from the following equation:

$$\rho_f = \frac{1 - f(Q_f/Q_s)}{1 - f} \tag{1}$$

where $f$ is the ratio of the area of the spherical surface occupied by the entrance port of the auxiliary sphere to the total area of the auxiliary sphere including the port.

The ratio of the measurement $Q_f$ of the flat plate to the measurement $Q_r$ of the instrument standard is related to the absolute reflectance of the plate to the standard; thus:

$$\frac{Q_f}{Q_r} = \frac{\rho_f}{\rho_r} \tag{3}$$

and the absolute reflectance of the standard is:

$$\rho_r = \frac{Q_r}{Q_f} \cdot \rho_f \tag{4}$$

The absolute reflectance of an unknown is related to the absolute reflectance of the instrument standard by the ratio of the measurements of the unknown with respect to the standard times the reflectance of the standard in the same manner as indicated in Equation 4; thus:

$$\rho_x = \frac{Q_x}{Q_r} \cdot \rho_r \tag{5}$$

where $\rho_x$ is the absolute reflectance of the unknown, $Q_x$ is the instrument reading for the unknown, $\rho_r$ is the absolute reflectance of the instrument standard calculated from Equation 4 and $Q_r$ is the instrument reading for the instrument standard.

It will be noted from the foregoing that the accuracy to which the instrument may be calibrated by use of the instrument standard is dependent upon the accuracy to which the reflectance of the flat plate may be determined.

The efficiency or effective reflectance $(\rho_s)$ from the opening of a given integrating sphere is given by the equation:

$$\rho_s = \rho_w \frac{f}{1 - \rho_w(1 - f)} \tag{6}$$

where $\rho_w$ is the absolute reflectance of the sphere wall.

If the wall reflectance $(\rho_w)$ of the sphere is assumed to be identical to the reflectance of the flat plate $(\rho_f)$, i.e., $\rho_w$ equals $\rho_f$, and the ratio of the measurements $Q_s$ and $Q_f$ is taken, we have:

$$\frac{Q_s}{Q_f} = \frac{\rho_s}{\rho_w} \tag{7}$$

Substituting Equation 6 in Equation 7 gives $$\frac{Q_s}{Q_f} = \frac{\rho_w f}{\rho_w[1 - \rho_w(1 - f)]} \tag{8}$$

and solving for the sphere wall reflectance $(\rho_w)$, we have:

$$\rho_w = \frac{1 - f\dfrac{Q_f}{Q_s}}{1 - f} \tag{9}$$

From Equation 9 we see that the reflectance of the sphere wall may be calculated from the measurement of the relative plate reflectance $Q_f$, the relative sphere reflectance $Q_s$, and the port-to-sphere area ratio $(f)$. Equation 9 is based upon the assumption that the reflectance of the flat plat and the sphere wall are identical. The actual equation is $$\rho_w = \frac{1 - \frac{\rho_w}{\rho_f}(f)\frac{Q_f}{Q_s}}{1-f} \quad (10)$$

and when the assumption that $\rho_w$ and $\rho_f$ is valid, the term $\rho_w/\rho_f$ becomes unity.

The accuracy of Equation 9 is based upon the assumption that (1) the coatings present perfect diffusing surfaces, (2) the inner surface of the sphere is nearly uniform, and (3) that the surface of the flat plate is precisely the same as the surface of the sphere.

The absolute reflectance ($\rho_w$) of the sphere wall may be calculated to a very high degree of accuracy even though the reflectance of the flat plate ($\rho_f$) differs from the wall reflectance of the sphere ($\rho_w$) by as much as five percent. However, it is apparent from Equations 4 and 5 that the accuracy to which the reflectance of the instrument standard ($\rho_r$) or of an unknown ($\rho_x$) may be determined is directly dependent upon the accuracy to which the reflectance of the flat plate ($\rho_f$) is known. If the actual reflectance of the flat plate differs from its assumed or calculated reflectance by as much as five percent of the value of the reflectance of the sphere wall, this error is directly incorporated into Equations 4 and 5.

The method and apparatus described herein avoid the foregoing problems and the errors introduced by the use of different surfaces which are presumed identical by providing measurements from the same sphere surface in order to establish the absolute reflectance of the standard utilized to calibrate a measuring instrument. Further, the apparatus described herein may be utilized directly as the instrument standard if desired.

The single figure of the drawing illustrates an exemplary embodiment of a differential-port sphere constructed in accordance with the teachings of this invention.

Referring now to the drawing, there is illustrated, in oblique section, a differential-port sphere comprising a main block or body 10 of any suitable material, which, for example, may be aluminum or epoxy. A removable thin walled portion in the form of a plate 12 is provided which fits on one of the exterior surfaces of the body and is precisely aligned by three alignment pins, one of which is shown at 14. The pins are preferably permanently affixed in the plate 12 and set within holes formed in the body 10. The plate is removably secured to the body 10 by any suitable means, such as the spring clips 18 illustrated, screws or other suitable fastening means. With the plate 12 in place the body and plate may form any suitable shape, for example, a cube.

Formed within the body 10 and the removable plate 12 is a spherical cavity 20 positioned so as to form a port of diameter $b$ opening through the outer surface of the removable plate 12. With the plate 12 removed a port having a diameter $a$ is formed opening on the outer surface of the block 10 which mates with the removable plate. The removable plate is so arranged that when mounted on the body 10 the spherical cavity surface continues in the plate to the port $b$. For ease in manufacture the main body 10 may be divided into sections 10a and 10b and secured together by any suitable means such, for example, as screws through mating flanges formed on the outer surfaces of the sections one of which is illustrated at 22. It is generally desirable that the body 10 be divided through the center of the spherical cavity.

To utilize the spherical cavity for the determination of absolute diffuse spectral reflectance measurements, the interior surfaces forming the cavity are prepared in the manner well kown in the art, the usual method being to coat the surfaces with $BaSO_4$ or $MgO$. It is obvious that with the plate in place a spherical cavity having a port $b$ is formed and wtih the plate removed a larger port $a$ is provided in substantially the same spherical cavity. If now the differential-port sphere with the plate in place is mated with the sample port of the integrating sphere of a reflectance measuring instrument such as that illustrated in the aforementioned patent and an arbitrary reference plate of good quality is placed at the reference port, an instrument reading $Q_b$ is obtained. The plate 12 of the differentail sphere is removed and port $a$ is mated with the sample port of the integrating sphere in the aforementioned patent and a second instrument reading $Q_a$ is obtained.

The instrument readings may be represented by the equations:

$$Q_a = K \frac{\rho_a}{\rho_c} \quad (11)$$

$$Q_b = K \frac{\rho_b}{\rho_c} \quad (12)$$

where:
K=the instrumental constants,
$\rho_a$=the absolute reflectance of the sphere with port $a$,
$\rho_b$=the absolute reflectance of the sphere with port $b$,
$\rho_c$=the absolute reflectance of the arbitrary reference blank.

The ratio of the readings thus is $$\frac{Q_a}{Q_b} = \frac{\rho_a}{\rho_b} \quad (13)$$

Since Equation 6 is the general equation for the effective reflectance from any port as a function of the fall reflectance $\rho_w$ and the port-to-total sphere area $(f)$, we may substitute Equation 6 for the absolute reflectances of the sphere with each port in Equation 13 giving:

$$\frac{Q_a}{Q_b} = \frac{f_a \rho_w}{1-\rho_w(1-f_a)} \cdot \frac{1-\rho_w(1-f_b)}{f_b \rho_w} \quad (14)$$

where $\rho_w$ is the absolute reflectance of the sphere wall, $f_a$ is the ratio of the area of the port $a$ to the total sphere area, and $f_b$ is the ratio of the area of the port $b$ to the total sphere area.

Solving Equation 14 for $\rho_w$ we have:

$$\rho_w = \frac{1 - R \cdot \frac{f_b}{f_a}}{1 - f_b \left[\frac{R}{f_a} - R + 1\right]} \quad (15)$$

where R equals $Q_a/Q_b$.

From Equation 15 it is apparent that the absolute wall reflectance of the differentia-port sphere may be calculated from the measurements of $Q_a$ and $Q_b$ and the known physical dimensions of the sphere. Since for both measurements of $Q_a$ and $Q_b$ the same surface is utilized, the determination of the absolute wall reflectance is not dependent upon the assumption of identical surfaces as is the auxiliary single port sphere and flat plate method previously discussed.

As previously stated the wall reflectance of the sphere may be determined to a high degree of accuracy. If the differential port sphere is now utilized as the basis for the measurement of the instrument standard, the absolute reflectance of the standard may also be determined to a high degree of accuracy by utilizing the values of the wall reflectance and the instrument measurement for the differential sphere in Equation 4. It should also be noted that it is not necessary to utilize an instrument standard but the differential sphere may be utilized as the standard against which unknowns may be determined utilizing Equation 5. Since the absolute reflectance of the sphere wall may be computed with a high degree of accuracy this sphere may be utilized to calibrate the instrument such that it reads absolute diffuse spectral reflectance directly. The samples may be determined then within the accuracy limitations of the instrument.

The differential-port sphere herein disclosed may take any size and the block or body any shape depending upon the desired accuracy and space requirements. The body need not be in the form of a cube as described but may take the form of a sphere similar to that illustrated in the article entitled Evaluation of Absolute Reflectance for Standardization Purposes, 56 J. Opt. Soc. Am., 250 (1966), by Van der Akker et al. The body may also be provided with a disposable insert for repeated usage with different coatings such as paints and dye samples. It should also be noted that since both measurements of port reflectance are taken from the same sphere, the effects of aging of the wall material are compensated.

There has been illustrated and described a new and novel method and apparatus by which the accuracy of absolute diffuse spectral reflectance measurements of unknown samples may be determined. Although the invention has been described with particularity in connection with the particular exemplary embodiment illustrated in the drawing and various particular modifications and variations thereof, it should be understood that other various modifications and variations will be apparent to those skilled in the art without departing from the scope of the appended claims.

What is claimed is:

1. A differential-port sphere comprising:
   a body having a spherical cavity formed therein, said cavity terminating at an outer surface so as to form a port to said cavity;
   a cover member mating with said outer surface of said body and having formed therein a continuation of said spherical cavity terminating at an outer surface of said cover member so as to form another port to said cavity; and
   means for removably securing said cover member to said body.

2. The method of determining the absolute diffuse spectral reflectance of a differential-port sphere having first and second ports of differing diameter comprising the steps of:
   placing the first port of the differential-port sphere at the sample port of the integrating sphere of a spectroreflectometer and obtaining an instrument reading relative to an arbitrary reference;
   placing the second port of said differential-port sphere at the sample port of the integrating sphere of a spectroreflectometer and obtaining an instrument reading relative to an arbitrary reference;
   computing the absolute wall reflectance of the differential-port sphere from the equation:

$$\rho_w = \frac{1 - R \cdot \frac{f_a}{f_b}}{1 - f_b \left[ \frac{R}{f_a} - R + 1 \right]}$$

where:
   R = the ratio of the instrument reading for the large port to the instrument reading for the smaller port,
   $f_a$ = the larger port area to total sphere area ratio,
   $f_b$ = the smaller port area to total sphere area ratio.

3. The method of calibrating a spectroreflectometer for the direct measurement of absolute diffuse spectral reflectance comprising:
   placing the port of a differential-port sphere having a diffuse reflecting surface at the sample port of the integrating sphere of the spectroreflectometer to be calibrated and obtaining an instrument reading relative to an arbitrary reference;
   changing the port area of the differential-port sphere;
   placing the port of the differential-port sphere at the sample port of the integrating sphere of the spectroreflectometer and obtaining a second reading relative to an arbitrary reference;
   computing the absolute reflectance of the wall of the differential-port sphere from the equation:

$$\rho_w = \frac{1 - R \cdot \frac{f_a}{f_b}}{1 - f_b \left[ \frac{R}{f_a} + 1 \right]}$$

where:
   R = the ratio of the instrument reading for the large port to the instrument reading for the smaller port,
   $f_a$ = the larger port area to total sphere area ratio,
   $f_b$ = the smaller port area to total sphere area ratio; and
   adjusting the spectroreflectometer to read the value of $\rho_w$ with said differential-port sphere at said sample port.

4. A differential-port sphere for use in the determination of absolute diffuse spectral reflectance comprising:
   a main body including first and second separable sections, each section having approximately one-half of a spherical cavity formed therein and mating with the spherical cavity in the other section such that, when said sections are secured together, a spherical cavity is formed, the cavity in one of said sections terminating at an outer surface so as to form a first port to said cavity;
   means for securing said first and second sections to form said main body;
   a cover member mating with the outer surface of said one section and having formed therein a continuation of said spherical cavity terminating at an outer surface of said cover member so as to form a second port to said cavity of smaller size than said first port; and
   means for removably securing said cover member to said outer surface of said one section.

References Cited
UNITED STATES PATENTS 2,325,350   7/1943   West _____ 356—236

RONALD L. WIBERT, Primary Examiner

V. P. McGRAW, Assistant Examiner

U.S. Cl. XR

250—228

UNITED STATES PATENT OFFICE
CERTIFICATE OF CORRECTION

Patent No. 3,545,871           Dated December 8, 1970

Inventor(s) Franklyn L. Waska

It is certified that error appears in the above-identified patent and that said Letters Patent are hereby corrected as shown below:

Column 3, line 6, "and", second occurrence, should read -- equals --. Column 3, line 73, "wtih" should read -- with --. Column 4, line 6, "differentail" should read -- differential --; line 29, "fall" should read -- wall --; line 48, "differentia port" should read -- differential port --. Column 5, line 48, the equation should appear as shown below:

$$\rho_w = \frac{1 - R \cdot \dfrac{f_b}{f_a}}{1 - f_b \left[ \dfrac{R}{f_a} - R + 1 \right]}$$

Column 6, line 15, the equation should appear ash shown below $$\rho_w = \frac{1 - R \cdot \dfrac{f_b}{f_a}}{1 - f_b \left[ \dfrac{R}{f_a} - R + 1 \right]}$$

Signed and sealed this 20th day of April 1971.

(SEAL)
Attest:

EDWARD M. FLETCHER, JR.       WILLIAM E. SCHUYLER, J
Attesting Officer              Commissioner of Patent